United States Patent [19]
Taki et al.

[11] Patent Number: 5,662,442
[45] Date of Patent: Sep. 2, 1997

[54] TOOL CLAMPING MECHANISM

[75] Inventors: Yukio Taki, Kounan; Hiroyuki Suzuki, Niwa-gun, both of Japan

[73] Assignee: Okuma Corporation, Nagoya, Japan

[21] Appl. No.: 627,073

[22] Filed: Apr. 3, 1996

[30] Foreign Application Priority Data

Apr. 14, 1995 [JP] Japan ................... 7-113984

[51] Int. Cl.$^6$ ....................... B23Q 3/12
[52] U.S. Cl. ................. 409/233; 408/239 R
[58] Field of Search ................... 409/230, 231, 409/232, 233; 408/238, 239 R, 239 A

[56] References Cited

U.S. PATENT DOCUMENTS

| | | | |
|---|---|---|---|
| 3,684,303 | 8/1972 | Serra | 409/231 |
| 4,068,559 | 1/1978 | Schmid, Jr. et al. | 409/233 |
| 4,122,755 | 10/1978 | Johnson et al. | 408/238 |
| 4,290,720 | 9/1981 | Ferreira | 409/233 |
| 4,347,753 | 9/1982 | Claussen et al. | 74/110 |
| 4,411,568 | 10/1983 | Rohm | 409/233 |
| 4,680,999 | 7/1987 | Kojima et al. | 409/233 |
| 5,011,346 | 4/1991 | Pfalzgraf | 408/239 R |
| 5,018,916 | 5/1991 | Bauch et al. | 409/233 |
| 5,022,278 | 6/1991 | DeCaussin | 74/110 |
| 5,052,866 | 10/1991 | Bauch et al. | 409/233 |

FOREIGN PATENT DOCUMENTS

| | | | |
|---|---|---|---|
| 3230430A | 1/1984 | Germany | 409/232 |
| 57-21205 | 2/1982 | Japan. | |
| 60-34237 | 2/1985 | Japan. | |
| 61-19530 | 1/1986 | Japan. | |
| 62-255038 | 11/1987 | Japan. | |
| 1-193106 | 8/1989 | Japan. | |
| 2-104906 | 8/1990 | Japan. | |
| 3-40495 | 8/1991 | Japan. | |
| 4-41108 | 2/1992 | Japan. | |
| 1512714A | 10/1989 | U.S.S.R. | 409/232 |
| 1613250A | 12/1990 | U.S.S.R. | 409/232 |

*Primary Examiner*—Daniel W. Howell
*Assistant Examiner*—Christopher Kirkman
*Attorney, Agent, or Firm*—Oliff & Berridge

[57] ABSTRACT

A tool clamping mechanism for clamping a tool using a thrust applied by a hydraulic/pneumatic cylinder as an actuator. This thrust is weaker than that of coned disc springs withstanding a force applied during a cutting operation or the like of the tool. Compression of the coned disc springs is reduced so as to assure reliable and stable rotation of the spindle. The clamping mechanism further includes a force increasing mechanism constituted by sloped portions between a first draw bar and a second draw bar which is concentric to the first draw bar, a tapered surface of an annular piece, and a plurality of balls. When the second draw bar retreats, the balls are raised from the groove to a larger diameter portion of the second draw bar, so that an urging force of the coned disc springs acts on the first draw bar, and clamps the tool to the spindle. In order to unclamp the tool, the second draw bar is moved forward so as to put the balls into the groove on the first sleeve, and to interrupt the transmission of the urging force of the coned disc springs to the first draw bar, and to release the tool from the clamping mechanism.

4 Claims, 6 Drawing Sheets

TOOL CLAMPING MECHANISM

BACKGROUND OF THE INVENTION

1. Field of the Invention

This invention relates to a tool clamping mechanism which clamps a tool by pulling a stud thereof inward via a front end of a spindle.

2. Description of the Related Arts

A machine tool such as a machining center which can automatically exchange tools includes a tool clamping mechanism in its spindle so as to firmly hold a detachable tool therein against a force applied during a cutting, drilling or other operation thereof. In order to firmly hold the tool, such a clamping mechanism has a plurality of coned disc springs arranged in series. This is not only because the clamping mechanism has to generate an urging force of 1000 kgf to 3000 kgf for firmly holding the tool during its operation but also because the coned disc springs should be axially flexed by an amount of 20 mm to 30 mm when the tool is removed therefrom. Thus, a cylinder piston mechanism is required to provide a large thrust, which means that the spindle of the machine tool inevitably becomes large. Further, compressing the coned disc springs requires a large force and a long time. Further, it takes a long time to exchange the tool. In order to allow the coned disc springs to be deformed when they are flexed, clearances should be secured between a tool pulling shaft fitted through the coned disc springs and inner circumferences of the coned disc springs, and between the outer surfaces of the coned disc springs and the spindle. Thus, when the spindle is rotated, the coned disc springs move within the foregoing clearances. This prevents a reliable and high speed rotation of the spindle.

A variety of proposals have been made for overcoming the foregoing problems of the prior art. For instance, FIG. 1 of the accompanying drawings shows a tool clamping mechanism which includes a tool pulling shaft 102 fitted into a rotatable spindle 101 in order to firmly hold a tool. Further, the tool clamping mechanism includes a plurality of coned coil springs 103 for generating a strong pulling force to draw the tool pulling shaft 102 against a force applied to the tool, and a coil spring 104 having a weak force necessary only for supporting a weight of the tool. In response to a tool exchanging command at the end of a machining operation, a thick cylinder piston 105 pushes a sleeve 106 via a rod 105a, thereby compressing the coned disc springs 103. In order to exchange the tool, a thin cylinder piston 107 pushes the tool pulling shaft 102, compresses the coil spring 104, and moves the tool pulling shaft 102 as required. Two kinds of springs are used, and the stronger one is compressed prior to exchanging the tool. The other spring is then compressed so as to exchange the tool quickly.

Figure 2:
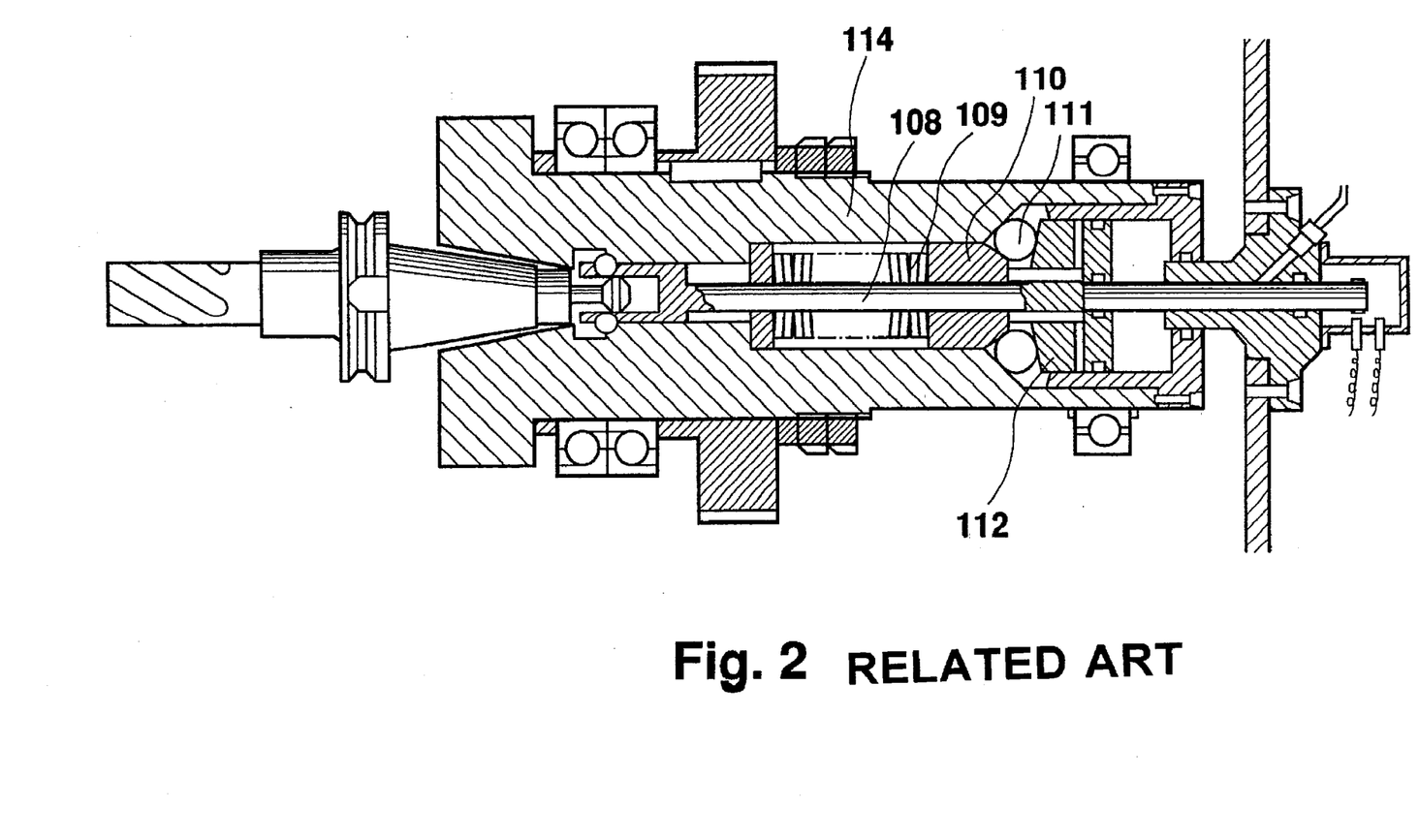
FIG. 2 is a view similar to FIG. 1, but showing the main part of a second example of the tool clamping mechanism of the related art, in which a force increasing mechanism is used so as to transmit an urging force of coned disc springs to a tool pulling shaft.

Referring to FIG. 2, Japanese Utility Model Laid-Open Publication No. Hei 2-104906 describes a tool clamping mechanism which includes a known force increasing mechanism for reducing the thrust of a cylinder piston necessary for compressing coned disc springs. A force of coned disc springs 109 surrounding a tool pulling shaft 108 is transmitted to the tool pulling shaft 108 via a tapered sleeve 110 and balls 111. In this arrangement, the balls 111 come into contact with a surface of the tapered sleeve 110, and a tapered surface of a spindle 114, thereby increasing a force for the coned disc springs 109 to pull the tool. Thus, the tool can be pulled using the force of the coned disc springs 109 which is weaker than the tool pulling force. Further, it is possible to reduce the thrust of the cylinder piston when clamping the tool. This tool clamping mechanism is effective in making the cylinder piston compact and reducing the tool exchange time. Other tool clamping mechanisms with force increasing mechanisms are also disclosed in Japanese Patent Laid-Open Publications No. Sho 57-21205 and No. Hei 4-41108, and Japanese Utility Model Laid-Open Publication No. Hei 3-40495.

Figure 3:
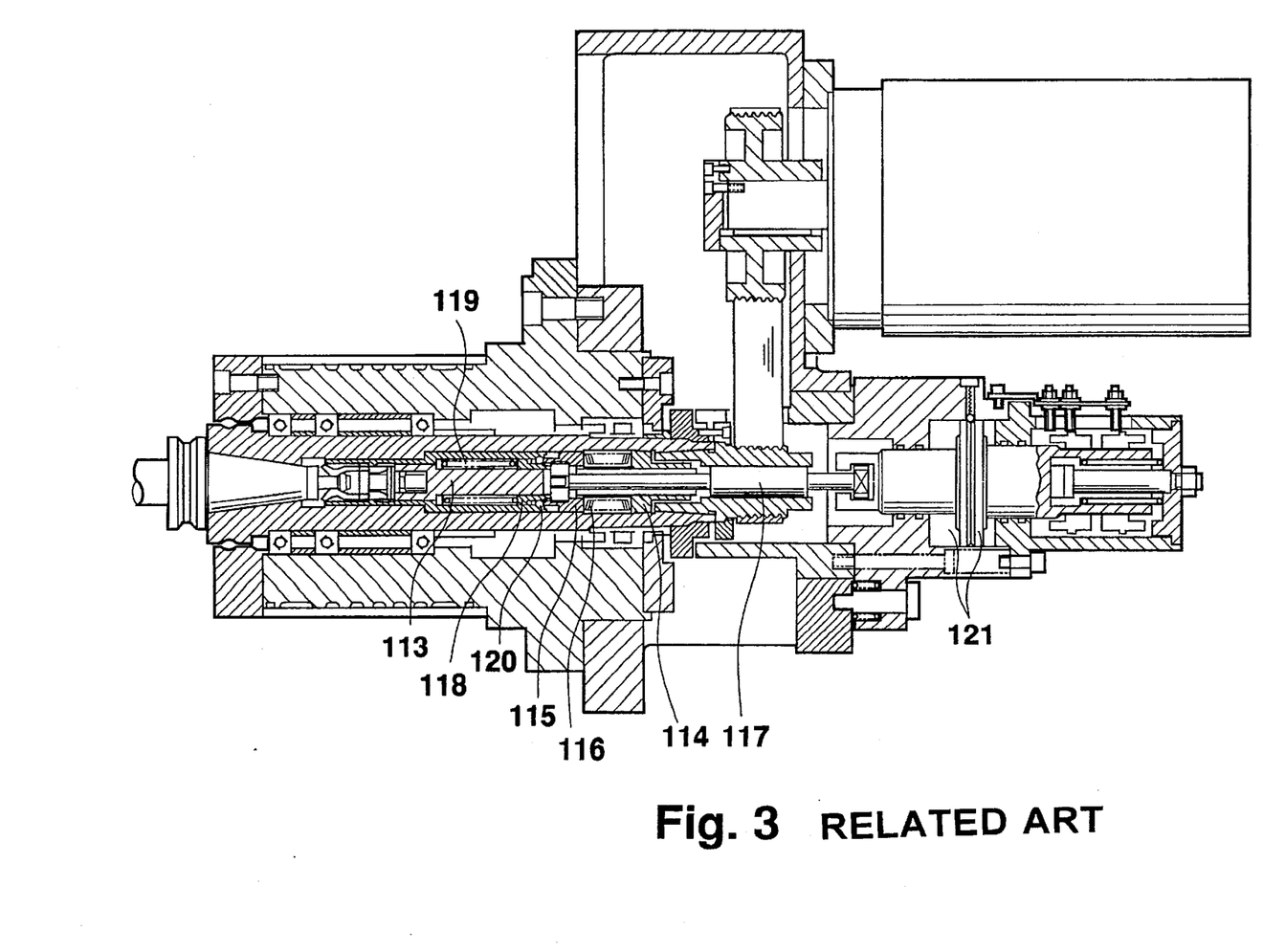
FIG. 3 is a view similar to FIG. 1, but showing the main part of a third example of the tool clamping mechanism of the prior art, in which the urging force of coned disc springs to a tool is interrupted when the tool is exchanged.

Japanese Patent Laid-Open Publication No. Hei 1-193106 shows and describes a tool clamping mechanism in which no urging force is applied to a tool pulling shaft from coned disc springs when replacing a tool. Referring to FIG. 3, a coned disc spring nut 114 is fixed to a rear end of a first rod 113. Coned disc springs 116 are present between the coned disc spring nut 114 and a coned disc spring support 115 which confront with each other. A second rod 117 behind the first rod 113 advances to push a lock ring 118 forward against a force of a coil spring 119, thereby moving lock balls 120 inward. Thus, the spring support 115 becomes axially movable. When the second rod 117 is withdrawn, the lock rings 118 cause the lock ball 120 to move outward. Thereafter a axial movement of the spring support 115 is restricted. In order to release the clamped tool, the cylinder piston 121 pushes the second rod 117 forward, moves the lock ball 120 inward, enables the first rod 113 and the coned disc springs 116 to move, and prevents the urging force of the coned disc spring from being transmitted to the coned disc spring nut 114.

Figure 1:
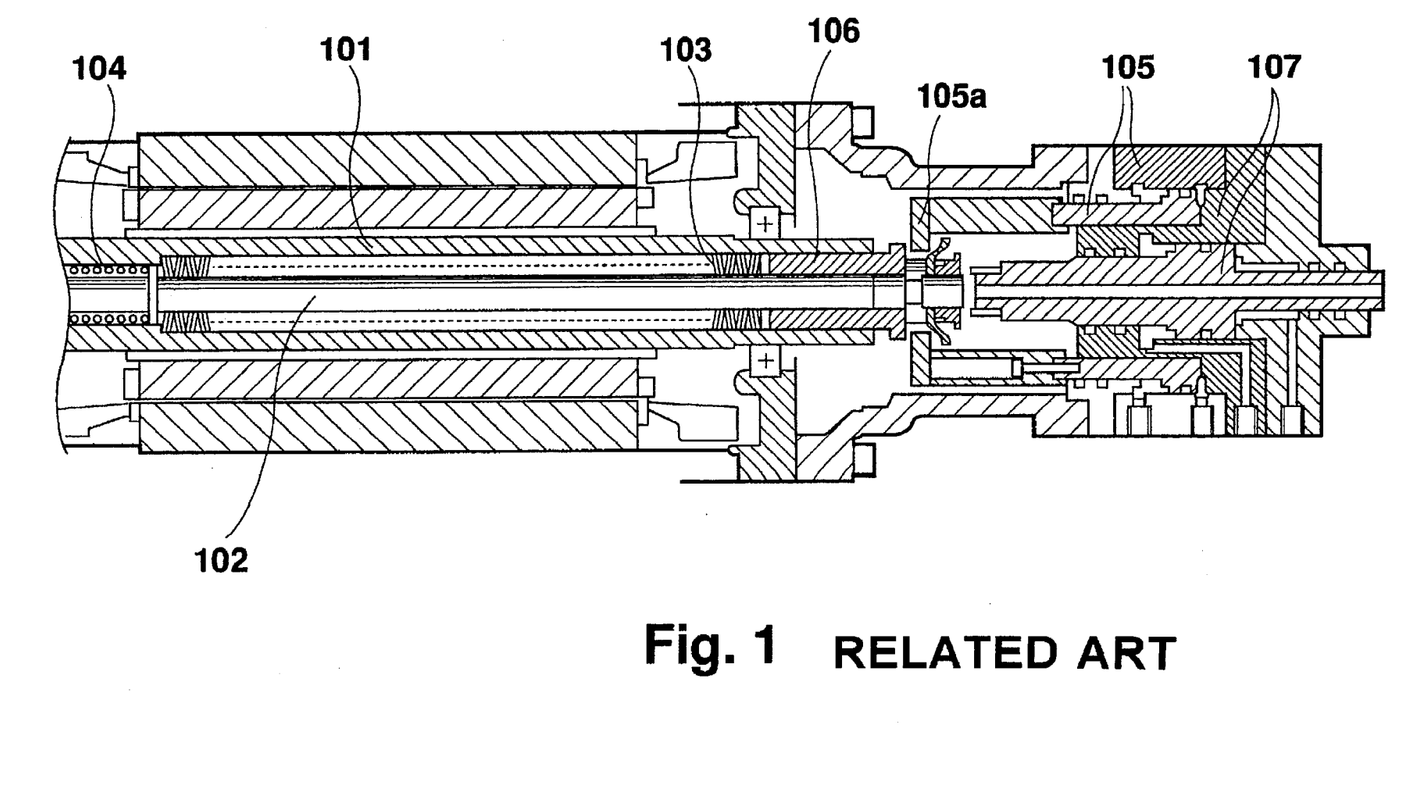
FIG. 1 is a cross section showing a main part of a first example of a tool clamping mechanism of the related art, in which two cylinder pistons compress coned disc springs first, and then compress a coil spring.

The tool clamping mechanism of FIG. 1 should have the cylinder piston with a large thrust in order to compress the coned disc springs 103, and the cylinder piston for the coil spring 104. This inevitably enlarges and complicates the tool clamping mechanism.

Referring to FIG. 2, the tool clamping mechanism can reduce the thrust of the cylinder piston, but cannot reduce a stroke of the cylinder piston. This is not effective in downsizing the tool clamping mechanism. Further, an extent by which the coned disc springs 109 are flexed is not reduced, so a number of coned disc springs 109 should be stacked. Thus, it is substantially impossible to overcome the problem of unreliable rotation of the spindle 114.

The tool clamping mechanism in FIG. 3 can reduce the flexed amount of the coned disc springs 116, and overcome the foregoing problem during the rotation of the spindle. However, the coned disc springs 116 are directly pushed by the cylinder piston, which should be large. Further, there is a problem that the tool may fall from the clamping mechanism at the moment the urging force for the first rod 113 is interrupted from the coned disc springs 116.

SUMMARY OF THE INVENTION

The present invention is aimed at overcoming the foregoing problems of the prior art, and providing a clamping mechanism in which a cylinder piston is compact, the number of coned disc springs is reduced since they are flexed relatively slightly, a spindle can rotate at a high speed, and a tool is not dropped.

According to a first aspect of the invention, there is provided a tool clamping mechanism for clamping a tool by drawing a pull stud of the tool via a front end of a spindle. The clamping mechanism comprises: a first draw bar including a collet for holding the tool and being axially movable in the spindle; a first spring for urging the first draw bar in a direction for pulling the tool; a first sleeve which is fixed at its one to a rear end of the first draw bar, extends at its opposite end from a rear end of the spindle, and, on its outer surface, has at least two through-holes extending toward the axis center; a plurality of rolling members movable in the through-holes; a second draw bar fitted into the first sleeve, being axially movable therein and having a groove on its outer surface into which the rolling members fall when the second draw bar moves forward; a second sleeve being axially movable on the outer surface of the first sleeve, the second sleeve having at its one end a portion which is tapered toward the front end of the spindle and which the rolling members come into contact with; a second spring in contact with the end of the second sleeve, the second spring urging the second sleeve in the direction for pulling the tool; a third sleeve surrounding the outer surface of the spindle, and being capable of coming into contact with the second sleeve; and an actuator for axially moving the second draw bar, the actuator causing the rolling members to be thrusted out of the outer groove of the second draw bar, and the tool to be clampled by transmitting an urging force of the second spring to the first sleeve via the rolling members. When the second draw bar is moved in the direction opposite to the direction for pulling the tool, the actuator causes the rolling members to be put into the groove on the second sleeve, a flange of a third sleeve to be contacted with the second sleeve, the transmission of the urging force of the second spring to the first sleeve to be interrupted, and a force for clamping the tool to be reduced.

When removing the tool from the clamping mechanism, the second draw bar is advanced by the actuator. Then, the rolling members, which are at a raised position such that the urging force of the second spring acts on the first draw bar, fall into the bottom of the groove on the outer surface of the second draw bar. At this instant, the urging force of the second spring on the first draw bar is interrupted, so only the urging force of the first spring pulls the tool. Thus, the force for clamping the tool is reduced. Since it is held by the force necessary for supporting its weight, the tool can be easily exchanged.

In order to clamp the tool, the second draw bar is withdrawn by the actuator, and the first draw bar is withdrawn by the urging force of the first spring, so the tool will be held by the collet. The first draw bar stops moving when the tool comes into contact with the tip of the spindle. Further withdrawal of the second draw bar causes the rolling members to come out of the bottom of the groove on the second draw bar, and begin moving on the sloped portion of the groove. In this state, a force increasing mechanism, which is constituted by an angle formed by the tapered portion of the rear part of the through-holes of the first sleeve and the tapered portion of the rear end of the second sleeve, and the sloped portion of the groove on the second draw bar, increases a force for pushing the second sleeve toward the front end of the spindle. Thus, the second spring is flexed by a necessary extent, thereby pulling the first draw bar in the direction to in which the tool is drawn.

In other words, the tool pulling shaft is divided into the first and second draw bars, so the force increasing mechanism moves the rolling members due to the axial movement of the second draw bar at its rear end. For instance, a tool clamping force of 1000 kgf can be provided by the actuator whose thrust is nearly as half as the force of the tool. Further, since the second spring can be instantly compressed, the actuator can be reduced in size. This means that the clamping mechanism can be made compact, and a time period for automatically exchanging the tool can be shortened. Further, the number of coned disc springs can be reduced by reducing a compression extent of the second spring. Thus, the spindle can rotate reliably, smoothly and at a high speed.

BRIEF DESCRIPTION OF THE DRAWINGS

The invention will become more apparent from the following detailed description of the presently preferred embodiment when taken in conjunction with the accompanying drawings.

DETAILED DESCRIPTION OF THE PREFERRED EMBODIMENT

Figure 4:
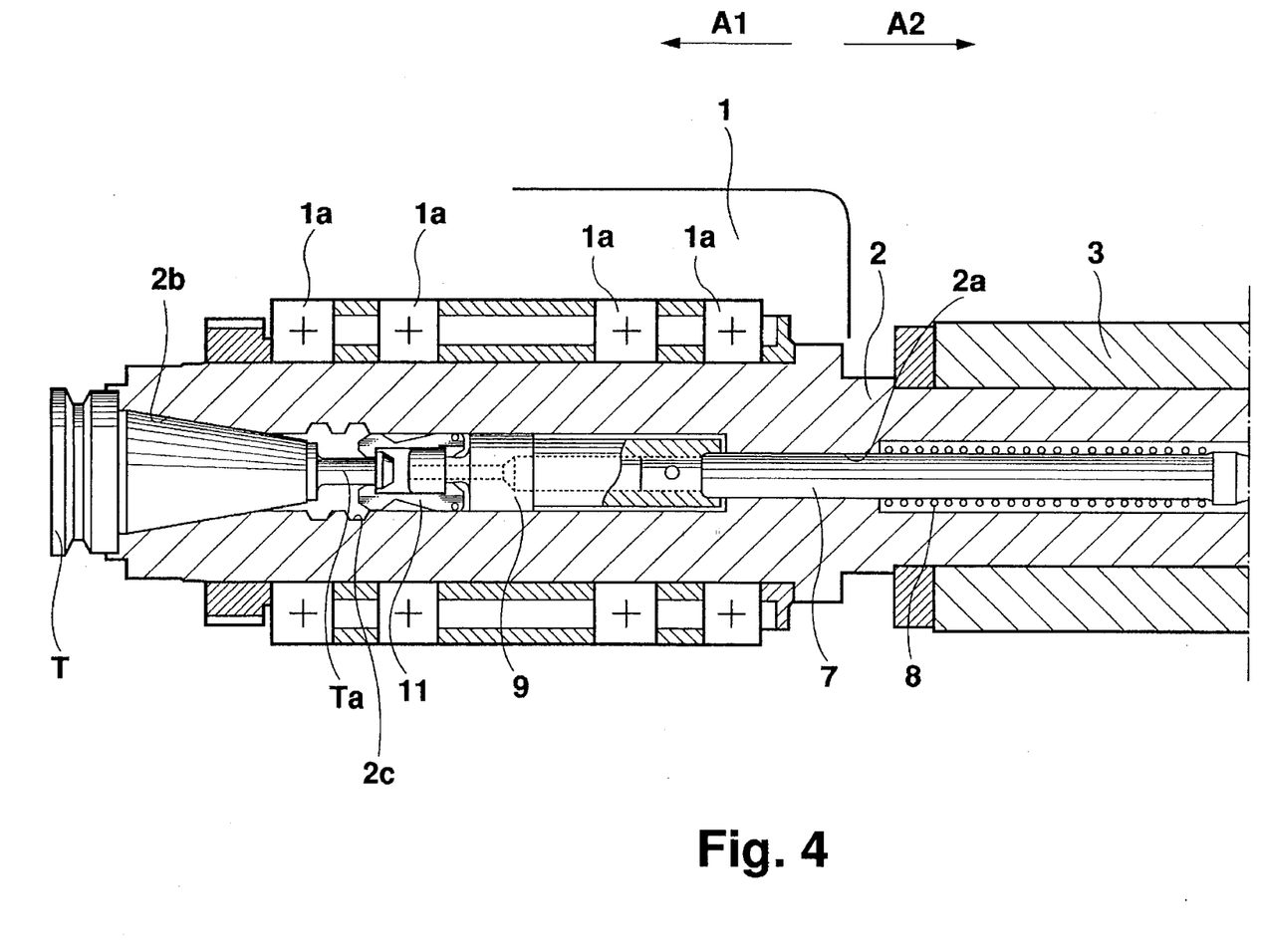
FIG. 4 is a cross section showing a front part of a tool clamping mechanism according to the present invention.
Figure 5:
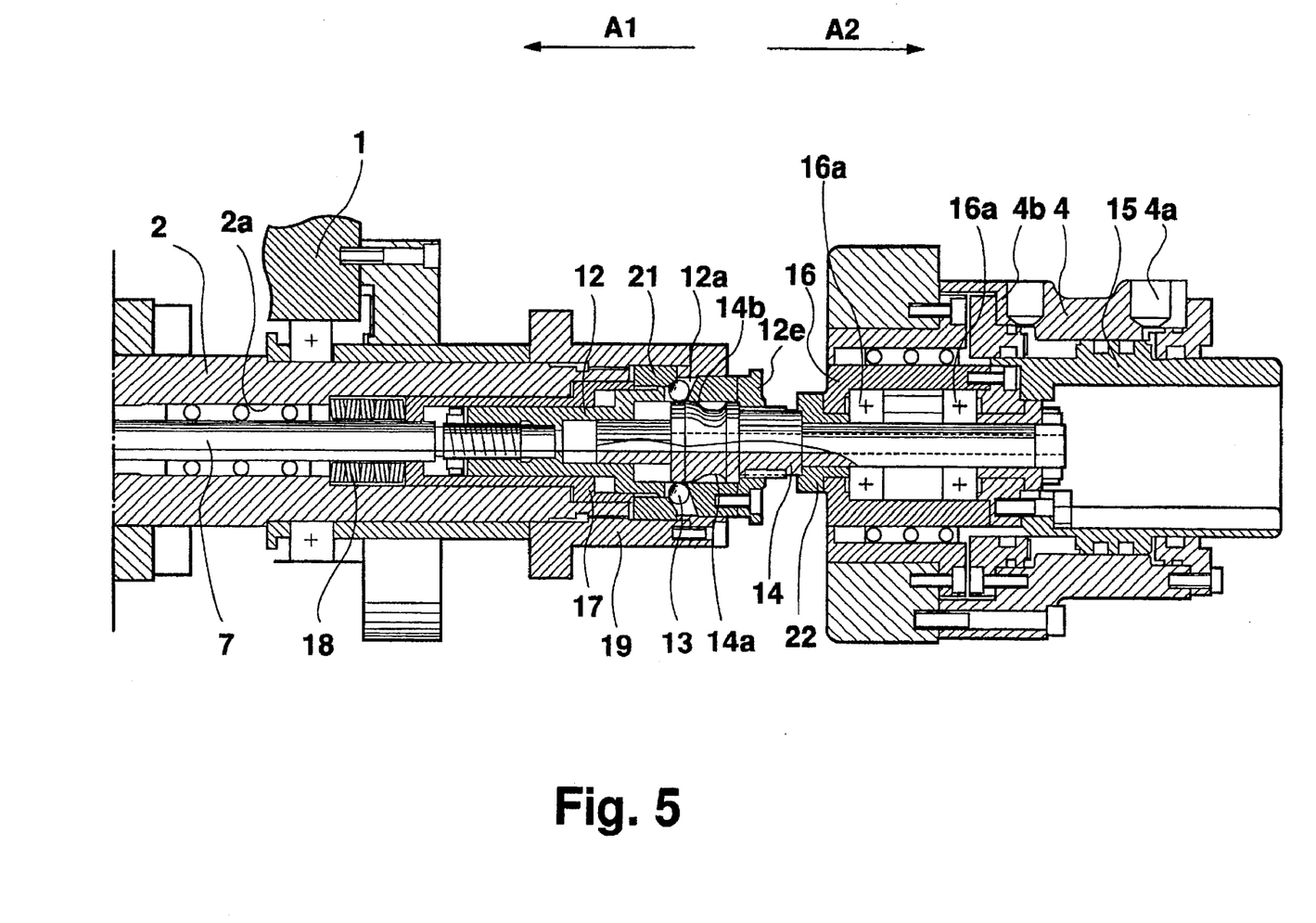
FIG. 5 is a cross section showing the remaining part of the tool clamping mechanism of FIG. 4.

The invention will be described with reference to the preferred embodiment shown in the drawing figures. A machine tool such as a machining center includes a tool clamping mechanism configured as shown in FIGS. 4 and 5. The tool clamping mechanism includes a spindle 2 which is rotatably attached to a spindle head 1 via a plurality of bearings 1a. The spindle 2 has a center cavity 2a therein. The center cavity 2a has a tapered portion 2b (called "orifice 2b") at its front end. A rotor 3 of a built-in motor is fitted at the center of the spindle 2 so as to rotate the spindle 2. A hydraulic/pneumatic cylinder 4 as an actuator is concentrically fitted around the rear part of the spindle 2.

A first draw bar 7 is inserted into the center cavity 2a of the spindle 2, and is axially movable therein (in the directions A1 and A2 in FIG. 4). A coil spring 8 surrounds the first draw bar 7, and is housed in the center cavity 2a together with the first draw bar 7. The coil spring 8 continuously urges the first draw bar 7 in the direction for pulling a tool T (in the direction shown by the arrow A2). A striker 9 is concentrically attached to the tip of the first draw bar 7. A well-known collet 11 is provided at the tip of the striker 9 so as to hold a pull stud Ta of the tool T. The collet 11 is opened and closed by the reciprocation of the striker 9 in response to the operation of the first draw bar 7, thereby holding the pull stud Ta.

Figure 6:
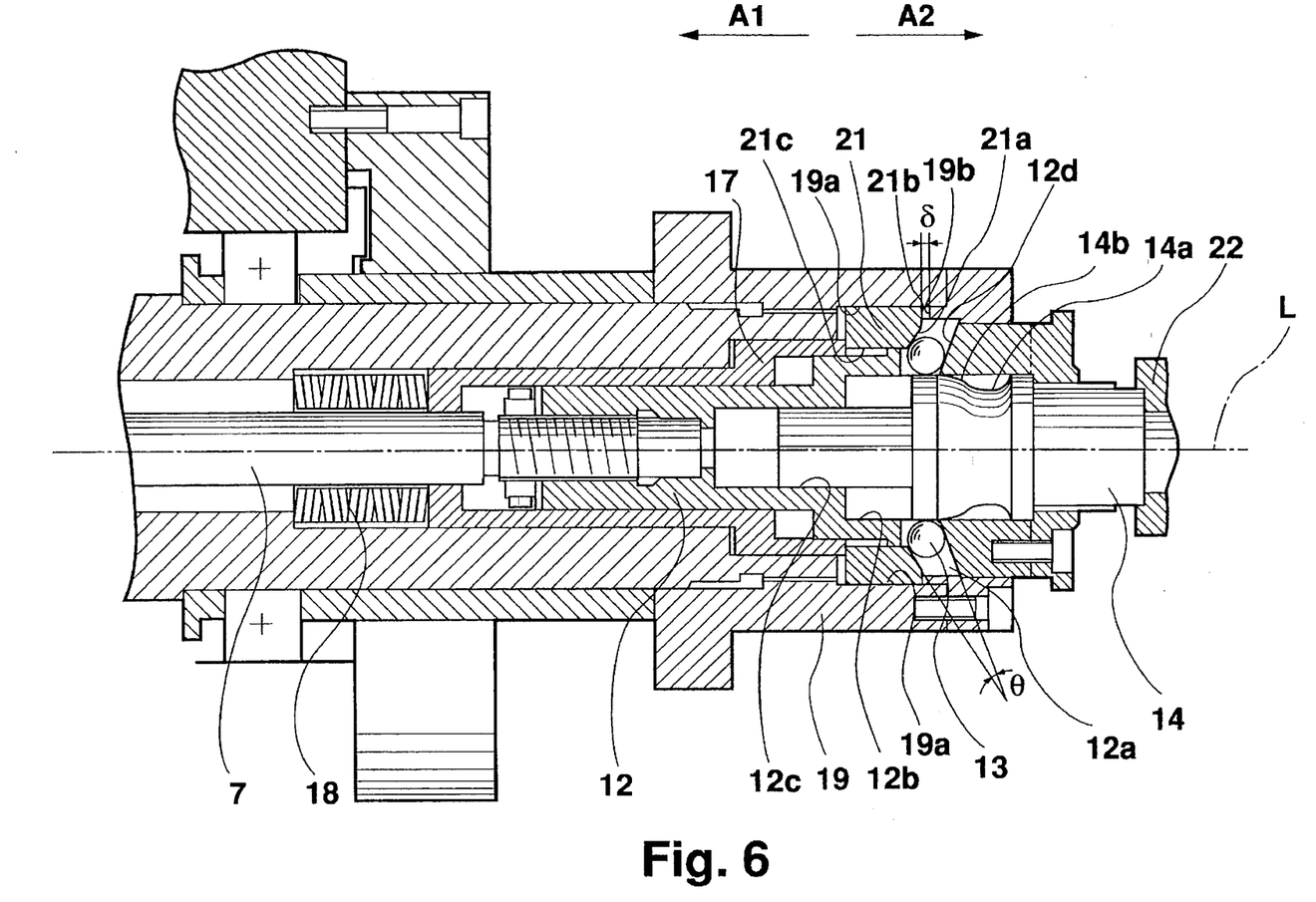
FIG. 6 is a cross section showing an area where rolling members are disposed.

Referring to FIGS. 5 and 6, a first sleeve 12 is concentrically screwed to and fixed to a rear end of the first draw bar 7. A rear end of the first sleeve 12 extends from the rear end of the spindle 2. The first sleeve 12 has a plurality of through-holes 12a extending toward the axis center. These through-holes 12a are substantially at the center of an area where the first sleeve 12 extends away from the spindle 2. For instance, eight passages 12a are formed on the surface of the first sleeve 12 spaced apart by equal angles. In this embodiment, each passages 12a has a slope 12d with respect to the axis center L. The through-holes 12a may be orthogonal to the axis center L. Balls 13 or rollers as rolling members are placed in the through-holes 12a, and are movable toward the center L of the axis.

A front end of a second draw bar 14 is inserted into cylindrical spaces 12b and 12c so as to be movable only axially. A rear end of the second draw bar 14 is rotatably supported by a cylindrical piston rod 16 via a plurality of bearings 16a. The cylindrical piston rod 16 is concentrically fixed to a piston 15 of the hydraulic/pneumatic cylinder 4. The second draw bar 14 is axially moved by a hydraulic or pneumatic force supplied via a fluid inlet/outlet 4a or 4b.

The second draw bar 14, which is fitted in the cylindrical space 12b of the first sleeve 12, has a groove 14a on the outer surface at its large diameter portion. The balls 13 are movable in and out of the groove 14a. The groove 14a is positioned such that the balls 13 fall thereinto as soon as the second draw bar 14 advances from its retreat position. The groove 14a has a smoothly tapered portion 14b near the spindle 2 (shown at the left side in FIG. 6). Thus, the balls 13 are raised by a wedge effect when the second draw bar 14 moves backwards.

A second sleeve 17 surrounds the first sleeve 12, and is axially movable thereon. Therefore, the second sleeve 17 is also axially movable in the center cavity 2a of the spindle 2. The second sleeve 17 is continuously urged toward the direction A2 (FIGS. 5 and 6) by a plurality of coned disc springs 18 fitted in the center cavity 2a of the spindle 2. The coned disc springs 18 can generate a stronger urging force than the force of the coil spring 8, which generates an urging force for supporting the weight of the tool (several kgf to several ten kgf). The coned disc springs 18 provide the urging force of 1000 kgf to 3000 kgf for withstanding a force applied when the tool performs its milling or other operation.

A third sleeve 19 surrounds the outer rear surface of the spindle 2. An annular piece 21 is in contact with the rear end of the second sleeve 17, and fits into a groove 19a on the inner surface of the third sleeve 19 and is axially movable therein. Axial movement of the annular piece 21 is regulated by opposite side walls of the groove 19a on the inner surface of the third sleeve 19. Alternatively, the annular piece 21 may be integral with the second sleeve 17.

The annular piece 21 has a tapered portion 21a with which the balls 13 come into contact. Thus, the annular piece 21 is continuously urged in the direction A2 (shown in FIGS. 5 and 6) by the urging force of the coned disc springs 18 applied via the second sleeve 17. An angle θ is formed by the tapered portion 21a of the annular piece 21 and the tapered portion 12d of the through-holes 12a, so that virtual continuation of the tapered portions converge at a point away from the axis center. For instance, the angle θ is 15°. When the second draw bar 14 is at its retreat position, the balls 13 are pushed to the large diameter portion of the second draw bar 14, and are squeezed into the space defined by the tapered portions 21a and 12d. Thus, the annular piece 21 and the second sleeve 17 are moved in the direction A1 (i.e. toward the front end of the spindle 2) against the urging force of the coned disc springs 18.

The rear end 21b of the annular piece 21 comes out of contact with a flange 19b of the groove 19a of the third sleeve 19. A space δ between the rear end 21b and the flange 19b is approximately 1 mm, for instance. In this state, the coned disc springs 18 pull the first draw bar 7 in the direction for drawing the tool T with the urging force (e.g. 1000 kgf). Therefore, the first draw bar 7 pulls the tool T toward the orifice 2b of the spindle 2 with the urging force necessary for withstanding the cutting force of the tool T.

The forward movement of the second draw bar 14 makes the balls 13 fall into the groove 14a. Then, the annular piece 21 is axially movable without any problem since a diameter of an areas formed by the balls 13 becomes smaller than the inner diameter of the hole 21c of the annular piece 21. The annular piece 21 is moved in the direction A2 by the urging force of the coned disc springs 18, thereby reducing the space δ to zero. In this state, the urging force of the coned disc springs 18 acts on the third sleeve 19, interrupting the transmission of the urging force to the first sleeve 12, and releasing the tool T from the urging force of the coned disc springs 18. The tool T is pulled by the coil spring 8, whose force is weaker than that of the coned disc springs 18, into the orifice 2b of the spindle 2, and remains held by the spindle 2.

In operation, the tool T is released from the clamping mechanism by supplying the working fluid such as oil or air to the fluid inlet/outlet 4a of the hydraulic/pneumatic cylinder 4. The piston 15 and the second draw bar 14 start to advance in the direction A1. Then, the balls 13 move on the tapered portion 14b and fall into the bottom of the groove 14a. Thus, the diameter of the area formed by the balls 13 becomes smaller than the diameter of the annular piece 21. The annular piece 21 is moved in the direction A2 by the urging force of the coned disc springs 18, coming into contact with the rear wall 19b of the groove 19a of the third sleeve 19, and reducing the space δ to zero. In other words, the urging force of the coned disc springs 18 acts on the third sleeve 19. This interrupts the transmission of the urging force of the coned disc springs 18 to the first sleeve 12. Only the coil spring 8 supplies the force for urging the first draw bar 7 in the direction A1. The tool T remains held in the orifice 2b of the spindle 2 with the weak force supplied by the coil spring 8. This weak force is sufficient for the spindle 2 to withstand the weight of the tool T.

The second draw bar 14 is further moved in the direction A1. Then, a collar 22 fixed to the second draw bar 14 comes into contact with the rear end 12e of the first sleeve 12, thereby advancing the first sleeve 12 and the first draw bar 7 in the direction A1. The forward movement of the first draw bar 7 puts the collet 11 in the groove 2c on the inner surface of the spindle 2. Thus, the collet 11 is opened, and releases the pull stud Ta. Further forward movement of the first draw bar 7 enables the striker 9 to strike the pull stud Ta, thereby releasing the tool T from the orifice 2b of the spindle 2.

The tool T will be clamped to the clamping mechanism as described hereinafter. First of all, the tool T is inserted into the orifice 2b of the spindle 2. In this state, the working fluid is supplied to the fluid inlet/outlet 4b of the hydraulic/ pneumatic cylinder 4. The piston 15 and the second draw bar 14 retreat in the direction A2. The coil spring 8 urges the first draw bar 7 and the striker 9 backward. Thus, the collet 11 grips the tip of the pull stud Ta of the tool T. The tool T fits into the orifice 2b of the spindle 2, thereby stopping the movement of the first draw bar 7 and the first sleeve 12. The second draw bar 14 moves further backward, and the collar 22 leaves from the first sleeve 12. The balls 13 move upward on the tapered portion 14b from the bottom of the groove 14a.

The thrust applied to the annular piece 21 is increased by the force increasing mechanism. The force increasing mechanism is constituted by the angle θ and the tapered portion of the second draw bar. The angle θ is formed by the tapered portion 12d of the rear part of the through-holes 12a of the first sleeve 12, and the tapered portion 21a of the annular piece 21. The annular piece 21 and the second sleeve 17 are moved in the direction A1, thereby compressing the coned disc springs 18. When the second draw bar 14 reaches its retreat position, the balls 13 come into contact with the large diameter portion of the second draw bar 14 and stay there. The annular piece 21 moves away from the rear wall 19b of the groove 19a, thereby providing the space δ. The coned disc springs 18 urge the first draw bar 7 so as to clamp the tool T in the orifice 2b of the spindle 2 with the large force withstanding the cutting force of the tool T.

The coned disc springs 18 are flexed so as to produce the urging force of 1000 kgf, for example. Since the coned disc springs 18 are not required to be flexed with a force for releasing the tool T, it is possible to reduce the number of the coned disc springs 18. This means that a space for the coned disc springs 18 can be reduced, the tool clamping mechanism can be reduced in size, and the spindle 2 can be rotated at a high speed.

Further, the thrust of the cylinder piston can be increased by the force increasing mechanism, so the hydraulic/pneumatic cylinder 4 may be relatively small so as to produce the thrust of 250 kgf which enables the coned disc springs 18 to produce the urging force of 1000 kgf.

The annular piece 21 comes into contact with the rear wall 19b of the third sleeve 19 without delay. Since most of time necessary for exchanging the tool T is spent for compressing the coil spring 8, the coil spring 8 having a weak urging force can be quickly compressed, so the time for exchanging the tool can be reduced.

What is claimed is:

1. A tool clamping mechanism for clamping a tool by drawing a pull stud of the tool via a front end of a spindle, comprising:

(a) a first draw bar including a collet for holding the tool and being axially movable in the spindle;

(b) a first spring for urging the first draw bar in a direction for pulling the tool;

(c) a first sleeve which is fixed at a first end of the first draw bar, extends at an opposite end from a rear end of the spindle, and, on an outer surface, has at least two through-holes extending toward an axis center;

(d) a plurality of rolling members movable in the through-holes;

(e) a second draw bar fitted into the first sleeve, being axially movable therein and having a groove on an outer surface into which the rolling members fall when the second draw bar moves forward;

(f) a second sleeve being axially movable on the outer surface of the first sleeve, the second sleeve having one end portion which is tapered toward the front end of the spindle and with which the rolling members come into contact;

(g) a second spring in contact with the second sleeve, the second spring urging the second sleeve in the direction for pulling the tool;

(h) a third sleeve surrounding the outer surface of the spindle, and being capable of coming into contact with the second sleeve; and (i) an actuator for axially moving the second draw bar in the direction for pulling the tool, the actuator causing the rolling members to be thrusted out of the outer groove of the second draw bar, and the tool to be clamped by transmitting an urging force of the second spring to the first sleeve via the rolling members, and when the second draw bar is moved in a direction opposite to the direction for pulling the tool, the actuator causing the rolling members to be put into the groove of the second draw bar, a flange of the third sleeve to be contacted with the second sleeve, the transmission of the urging force of the second spring to the first sleeve to be interrupted, and a force for clamping the tool to be reduced.

2. The tool clamping mechanism according to claim 1, wherein the front end of the groove of the second draw bar is tapered toward the end of the first sleeve.

3. The tool clamping mechanism according to claim 1, wherein the urging force of the first spring is weaker than an urging force of the second spring.

4. The tool clamping mechanism according to claim 2, wherein the urging force of the first spring is weaker than an urging force of the second spring.

* * * * *